Oct. 6, 1959     E. P. BUGGE     2,907,131
FISH LURE
Filed May 21, 1956
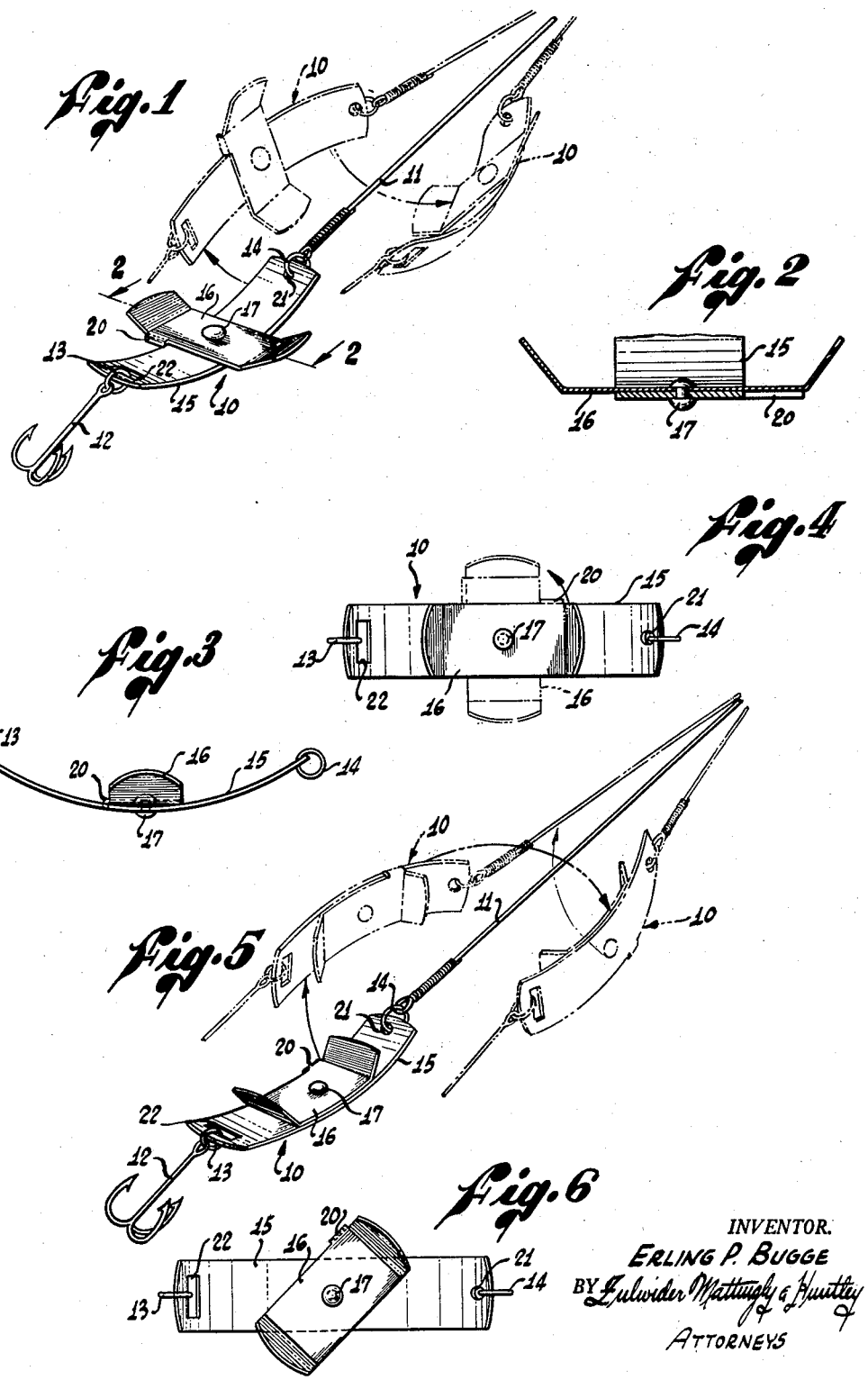
INVENTOR.
ERLING P. BUGGE
ATTORNEYS

United States Patent Office 2,907,131
Patented Oct. 6, 1959

2,907,131

FISH LURE

Erling P. Bugge, Los Angeles, Calif.

Application May 21, 1956, Serial No. 586,061

5 Claims. (Cl. 43—42.22)

This invention relates generally to fish lures, and more particularly to a lure of the type adapted to simulate the movement of a fish or minnow as it is drawn through the water.

Many different types of fish lures have heretofore been proposed and used with varying degrees of success, and these prior lures have ranged from meticulous representations of fish, to simple pieces of shiny metal, and even to a piece of white bone to which hooks are attached. While it is not definitely known why a fish will be attracted to a lure, it is recognized that movement of the lure as it is drawn through the water at least aids in attracting the attention of the fish.

Clearly, a variety of different types of motion are available. Thus, the lure may rotate or spin about its longitudinal axis, the axis along which it is being drawn, in which case the lure is generally referred to as a spinning lure or spinner. Instead of spinning, the lure may roll from side to side, in an oscillating manner, and such a lure is then spoken of as having a wiggling motion. Some lures move up and down as they are drawn along in a generally horizontal direction, thereby providing a third form of movement or action. In any particular lure, several of these motions may occur simultaneously, and fishermen may change from one form of lure to another as the effectiveness of any particular type of motion is demonstrated.

In addition to the motion of the lure, its general appearance is also important. Thus, on some occasions the fish will take only a lure of the well-known spoon type, while at other times, a spool lure will be disregarded and some other form of lure will be taken.

It is a major object of this invention to provide a new form of fish lure.

Another object of this invention is to provide a lure that moves as it is drawn through the water, this movement being selectively in the form of spinning motion, wiggling motion, or an erratic motion somewhere in between a spinning and wiggling motion.

It is a further object of this invention to provide such a lure that is easily adjustable to provide any of a variety of types of motion.

Still another object of the invention is to provide a lure of the type described having an attractive appearance, both from the standpoint of the purchaser and of the fish for whom it is intended.

It is a still further object of the invention to provide a fish lure having the above characteristics, while being of simple and inexpensive construction so that the lure may be sold at a low price.

These and other objects and advantages of my invention will become apparent from the following description of a preferred form thereof and from the drawings illustrating that form in which—

Figure 1 is a perspective view of the improved lure, set to provide a wiggling motion, with the positions sequentially assumed by the lure indicated in phantom outline;

Figure 2 is a transverse sectional view of the lure shown in Figure 1, taken on the line 2—2 therein;

Figure 3 is a side elevational view of the lure, set as shown in Figure 1;

Figure 4 is a plan view of the lure, set in an alternate position, but illustrating the position shown in Figure 1 by the phantom outline position of the cross member;

Figure 5 is a perspective view of the lure set to provide a spinning motion, with the successive positions of the lure being indicated by the arrows and the phantom outlines; and Figure 6 is a plan view of the lure adjusted to provide an erratic motion, somewhere between a spinning and a wiggling action.

Referring now to the drawings, and particularly to Figures 1 through 4 thereof, the numeral 10 indicates generally the improved lure, shown in Figure 1 as being attached by a leader 11 to a swivel (not shown) which in turn is attached to the fishing line. At the rear end of the lure is a hook 12, attached to the lure by a ring 13. A similar ring 14 may be used to connect the leader 11 to the forward end of the lure 10.

The lure 10 consists essentially of a body member 15 of a generally elongated shape, to which there is a rotatably attached a cross member or arm 16, held to the body member by suitable means such as a rivet 17. Preferably, the body member 15 is formed of a flat strip of metal whose length is several times its width, and which is bent or curved about an axis parallel to the transverse axis of the body member. The thickness of the body member 15 is not critical, but it should be thick enough to retain its shape, and, of course, sustain without damage the load imposed upon it when a fish takes the hook 12, as by striking the latter.

At substantially the midpoint of the body member 15 is the rotatable cross member 16, held to the body member by the rivet 17. The cross member 16 is somewhat shorter than the body member 15, and by way of example, may be approximately half as long. The width of the cross member 16, however, is approximately the same as that of the body member 15 so that when the two are parallel with each other, the sides of both are in alignment. The ends of the cross member 16 are bent upwardly, away from the body member 15, so that, in effect, a pair of vanes are formed. These vanes and their position aid in determining and controlling the movement of the lure.

Generally, the cross member 16 is formed of thinner material than the body member 15, and the middle portion of the cross member, between the upturned ends, may be substantially flat, as shown in Figure 2. Alternatively, this middle portion may be curved slightly to conform to the curvature of the body member 15 so that when the cross member and the body member are aligned, neither member is stressed. When the flat construction, shown in Figure 2, is used, the thinner cross member 16 is stressed to conform to the body member 15 so that frictional engagement tends to hold the two members in their adjusted position.

To aid in the rapid adjustment of the cross member 16, a down-turned ear 20 is formed on the side of the cross member 16 adjacent the upturned end, this ear being so located that when the cross member is aligned with the body member 15, the inner surface of the ear bears against the side of the body member, as illustrated in Figure 4, and when the cross member is perpendicular to the body member, the end of the ear bears against the side or edge of the body member, as illustrated in phantom outline in Figure 4.

The ring 14 to which the leader 11 is attached at the forward end of the lure, passes through a hole or aperture 21, while the ring 13, to which the hook 12 is attached at the rear of the lure, is preferably passed through a transversely extending slot 22. The use of the slot 22 seems to enhance the movement of the lure and increase its effectiveness in attracting fish, but in general this does not seem to be an essential feature of the invention.

Preferably, the body member 15 and the cross member 16 of the lure 10 are formed of shiny metal, and if desired, the upturned ends of the cross member may be colored, as with red paint, to improve the lure's effectiveness.

As previously mentioned, when the cross member 16 is turned so that it is substantially perpendicular to the body member 15, the lure 10 will oscillate back and forth, about an axis generally parallel to the line of forward movement of the lure as the latter is drawn through the water. This movement may generally be described as a wiggling motion, and is illustrated generally in Figure 1, where the full line representation of the lure indicates a more or less central or neutral position, and the first phantom outline, connected to the full line outline by the arrow, indicates one end or limit of the oscillation, while the second phantom outline represents the other end or limit. When the cross member 16 is rotated 90° to a position in alignment with the body member 15, the motion of the lure is changed and the lure rotates about an axis generally parallel to its direction of motion, and generally parallel to the longitudinal axis of the body member 15 as the lure is drawn through the water. Thus, as illustrated in Figure 5, if the lure is first in the position indicated by the solid line representation of the lure, the pulling of the lure through the water will cause it to rotate as indicated by the arrows and the phantom line representations of the lure. This rotating or spinning action is clearly different from the oscillating or wiggling action illustrated in Figure 1, and under different conditions, one form of motion may be more effective than the other in attracting fish.

In Figure 6, the lure is illustrated with the cross member 16 in an intermediate position. The motion that is produced by this adjustment can best be described as erratic, since it is, in effect, a combination of the spinning motion of Figure 5 and the wiggling motion of Figure 1, with one or the other generally predominating, as determined by the exact position of the cross member 16.

In each case, the particular motion that the lure 10 has will be influenced by currents within the water, so that the various motions herein described are approximate and not precisely delineated. To both the fisherman and the fish, the exact form of motion is relatively immaterial, so long as the fish are attracted to the lure and take it. The present lure, with its adjustable member and controllable motion, provides a simple and inexpensive lure of considerable versatility, and one that is fully capable of achieving the objects and securing the advantages heretofore set forth. It will be clear that changes may be made in the lure without departing from the broad features herein set forth, and consequently, the invention and the patent are not to be restricted to the particular form or arrangement of parts herein described and shown, except as limited by the claims.

I claim:

1. A fishing lure of the class described which includes: an elongated body member; means for attaching a leader to one end of said body member; other means for attaching a hook to the other end of said body member; a second member, shorter than said body member, rotatably attached to said body member at the middle thereof for adjustment between two limiting positions; stop means limiting the adjustment of said second member; and a vane at each end of said second member and projecting therefrom, said second member being substantially symmetrical about its point of attachment, and cooperating with said body member to cause transverse motion of the lure as it is drawn through the water, said motion being of one type when said second member is in the first of said limiting positions and of another type when said second member is in the other of said limiting positions.

2. A fishing lure of the class described which includes: an elongated body member; means for attaching a leader to one end of said body member; other means for attaching a hook to the other end of said body member; a second member, shorter than said body member, rotatably attached to said body member at the middle thereof for adjustment between a first position substantially aligned with said body member and a second position substantially perpendicular to said body member; stop means limiting the adjustment of said second member; and a vane on each end of said second member and projecting therefrom, said second member being substantially symmetrical about its point of attachment, and cooperating with said body member to cause transverse motion of the lure as it is drawn through the water, said motion being of one type when said second member is in its first position and being of another type when said second member is in its second position.

3. A fishing lure of the class described which includes: an elongated body member curved longitudinally about an axis parallel to its transverse axis; means for attaching a leader to one end of said body member; other means for attaching a hook to the other end of said body member; a second member, shorter than said body member, rotatably attached to said body member at the middle thereof for adjustment between a first position substantially aligned with said body member and a second position substantially perpendicular to said body member; stop means limiting the adjustment of said second member and a vane on each end of said second member and projecting therefrom, said second member being substantially symmetrical about its point of attachment, and cooperating with said body member to cause transverse motion of the lure as it is drawn through the water, said motion being of one type when said second member is in its first position and being of another type when said second member is in its second position.

4. A fishing lure of the class described which includes: an elongated body member curved about an axis parallel to its transverse axis; means for attaching a leader to one end of said body member; other means for attaching a hook to the other end of said body member; a second member, shorter than said body member, rotatably attached to said body member at the middle thereof for adjustment between a first position substantially aligned with said body member and a second position substantially perpendicular to said body member; an ear projecting from said second member, positioned to bear against a cooperating portion of said body member when said second member is in said first position, and against another cooperating portion of said body member when said second member is in said second position, whereby the range of adjustment of said second member is limited; and a vane on each end of said second member and projecting therefrom, said second member cooperating with said body member to cause motion of the lure as it is drawn through the water, said motion being of one type when said second member is in its first position and being of another type when said second member is in its second position.

5. A fishing lure of the class described which includes: an elongated body member curved about an axis parallel to its transverse axis; means for attaching the leader to one end of said body member; other means for attaching a hook to the other end of said body member; a second member, shorter than said body member, rotatably attached to said body member at the middle thereof for adjustment between a first position substantially aligned with said body member and a second position substantially perpendicular to said body member; an ear projecting from said second member, positioned to bear against a cooperating portion of said body member when said second member is in said first position, and against another cooperating portion of said body member when said second member is in said second position, whereby the range of adjustment of said second member is limited; and a vane on each end of said second member and projecting therefrom in a direction generally away from said body member, said second member cooperating with said body member to cause motion of the lure as it is drawn through the water, said motion being of a generally spinning nature when said second member is in said first position, and being of a generally wiggling nature when said second member is in said second position.

References Cited in the file of this patent

UNITED STATES PATENTS

| | | |
|---|---|---|
| 1,606,240 | Klaserner | Nov. 9, 1926 |
| 1,925,197 | Maynard | Sept. 5, 1933 |
| 1,977,003 | Maynard | Oct. 16, 1934 |
| 1,997,900 | Edwards | Apr. 16, 1935 |
| 2,021,796 | Liotta | Nov. 19, 1935 |
| 2,717,468 | Clough | Sept. 13, 1955 |